United States Patent [19]

Kane

[11] 3,962,802

[45] June 15, 1976

[54] EDUCATIONAL DEVICE

[75] Inventor: Michael J. Kane, Chelmsford, Mass.

[73] Assignee: Xerox Corporation, Stamford, Conn.

[22] Filed: Jan. 28, 1975

[21] Appl. No.: 544,736

[52] U.S. Cl............................ 35/19 B; 240/108 BA
[51] Int. Cl.².......................................... G09B 23/22
[58] Field of Search............. 35/19 B; 229/14 C, 15, 229/42; 240/2 M, 10.6 SD, 92, 108 BA; 350/271, 319; 352/101

[56] References Cited
UNITED STATES PATENTS

| | | | |
|---|---|---|---|
| 972,344 | 10/1910 | Davis | 352/101 |
| 1,687,881 | 10/1928 | Myers | 40/126 A UX |
| 1,983,374 | 12/1934 | Intemann | 40/126 A X |
| 2,316,305 | 4/1943 | Wright | 240/108 BA |
| 2,385,755 | 9/1945 | Bartow | 240/108 BA X |
| 2,538,407 | 1/1951 | Allen | 352/101 |
| 2,663,417 | 12/1953 | Kincaid | 229/14 C X |

FOREIGN PATENTS OR APPLICATIONS

| | | | |
|---|---|---|---|
| 922,181 | 1/1947 | France | 35/19 B |
| 488,472 | 7/1938 | United Kingdom | 240/108 BA |

*Primary Examiner*—Harland S. Skogquist

[57] ABSTRACT

A simple, durable, inexpensive educational device for demonstrating physical properties of beams of light especially adapted for use by educational institutions below the college level is described. The device comprises a sleeve means, a light source disposed adjacent one end of the sleeve, means for providing a first slot which is disposed adjacent the opposite end of the sleeve, and means for providing a second slot in axial alignment with the first slot.

3 Claims, 5 Drawing Figures

BEAM OF LIGHT

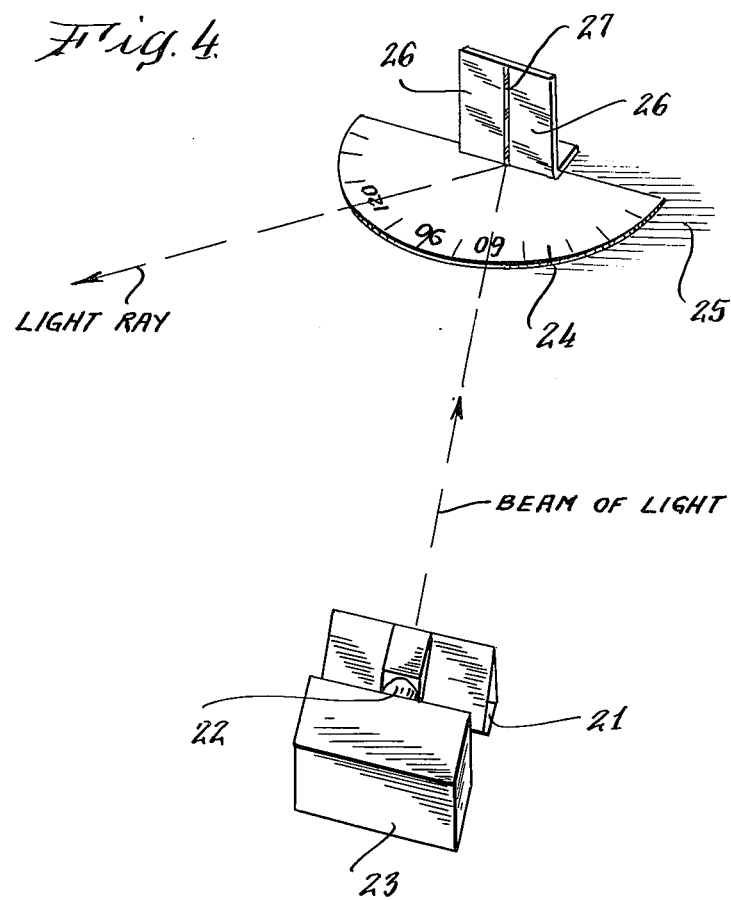
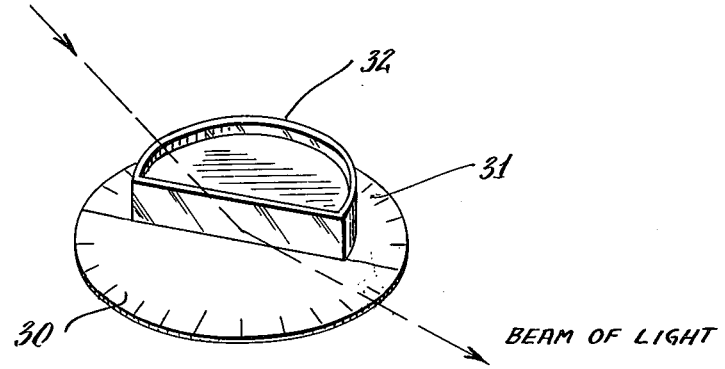

EDUCATIONAL DEVICE

BACKGROUND OF THE DISCLOSURE

I. Field of the Invention

This invention relates to an educational device, and more particularly to an educational device especially adapted for use by educational institutions below the college level for demonstrating physical properties of beams of light, referred to as a beam collimator.

II. Description of the Prior Art

An an educational device, the beam collimator is a fundamental tool for the teaching of principles relating to the physical properties of beams of light and can be used for the teaching of principles which can be applied to numerous areas of science in learning institutions below the college level. For example, a student is given an opportunity to perform independently the complete sequence of behavior involved in experimenting; constructing a hypothesis based on observation; designing a test of the hypothesis; interpreting data from the test; describing how the data support or do not support the hypothesis; and if necessary, revising the hypothesis and testing it again. Although the prior art describes numerous sophisticated and rather complex devices that can be used for illustrating the physical properties of a beam of light, none of the known devices are completely satisfactory for teaching these principles in learning institutions below the college level, especially at elementary grade levels. The prior art devices although satisfactory in some respects, i.e., known devices will illustrate the physical properties of a beam of light, however, they do not possess the combined advantages of being simple, relatively inexpensive, rugged, easily assembled and relatively portable when compared to the novel and advantageous device of the present invention.

SUMMARY OF THE INVENTION

It is, therefore, an object of the present invention to overcome the disadvantages stated hereinabove and to provide an educational device that is particularly useful for illustrating the physical properties of a beam of light which is simple, more durable, less expensive, more easily assembled and still more pleasing from a design viewpoint, than prior art devices and otherwise more suitable for use in learning institutions below the college level, especially for use in teaching science to students in elementary schools.

It is a further object of the present invention to provide an educational device for demonstrating various physical properties of a beam of light including, for example, the angle of incidence, the angle of reflection and refraction.

It is a further object of this invention to provide an educational device which is compact and easily handled when assembled.

It is a further object of this invention to provide an educational device which is quickly and easily disassembled for easy storage in a very small space.

It is a further object of this invention to provide an educational device which does not require a single grommet, screw, bolt, rivet, or similar fastening-type connection.

It is still a further object of this invention to provide an educational device which, in addition to its educational features and many mechanical advantages, possesses a pleasing design.

The foregoing objects and others are accomplished in accordance with the present invention by providing an educational device for demonstrating the physical properties of beams of light and for use with a light source comprising: sleeve means, a light source disposed adjacent one end of the sleeve means for providing a first slot, the slot being disposed adjacent the opposite end of the sleeve, and means for providing a second slot in axial alignment with the first slot.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 4 is a perspective view of an educational device in accordance with the invention being used to illustrate properties of a beam of light; and FIG. 5 is a second perspective view of an educational device in accordance with the invention being used to illustrate properties of a beam of light.

DESCRIPTION OF THE PREFERRED EMBODIMENTS

Figure 1:
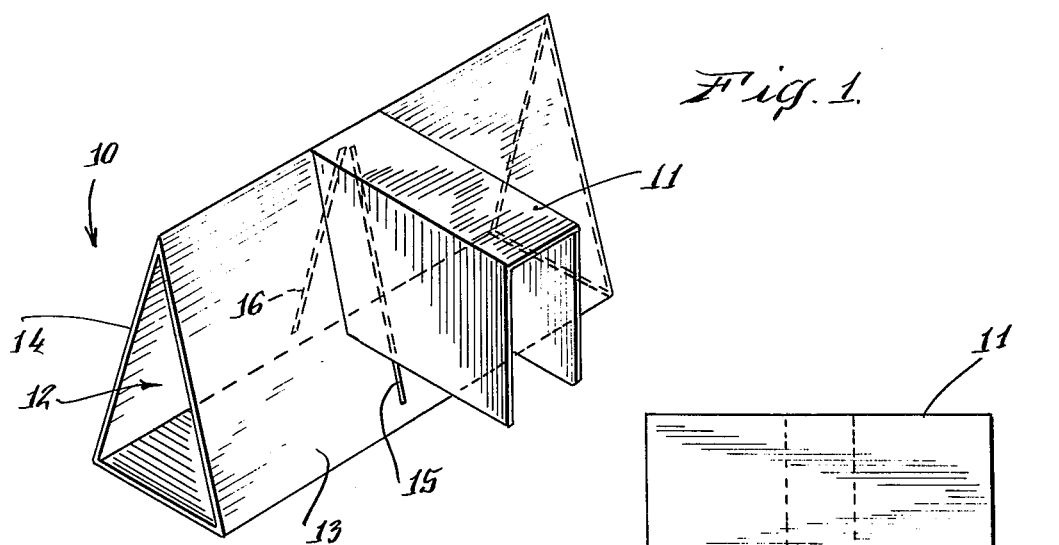
FIG. 1 is a perspective view of an educational device in accordance with the invention.
Figure 2:
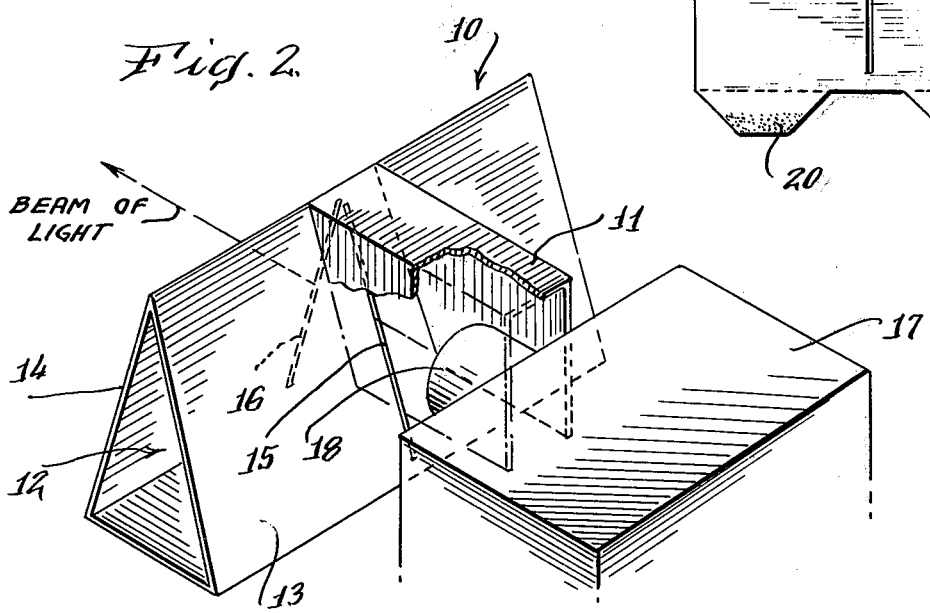
FIG. 2 is a perspective view of an educational device in accordance with the invention in place on a light projector partly in section.

Referring now to FIGS. 1 and 2, an educational device 10 in accordance with the features of this invention is shown to comprise a sleeve means 11 designed in a manner which permits various types of light sources to be contained therein. Secured to sleeve means 11 are means for providing first and second slots that are arranged in axial alignment with each other. The sleeve means is preferably provided in the form of triangularly shaped tube 12 having opposite surfaces 13 and 14 each of which contain elongated axially aligned slots 15 and 16.

An educational device or beam collimator described herein is used in conjunction with a light source for directing a narrow beam of light from the source so that the student can study various physical properties of beam of light leaving the device in a manner which is more clearly described hereinbelow. Various types of light sources can be used with the educational device described herein such as, for example, a light bulb or as clearly shown in FIG. 2, a light projector 17. When employing the arrangement as shown in FIG. 2, sleeve means 11 is preferably disposed over lens 18 which extends from the projector so as to contain the source of light therefrom. If necessary, the educational device 10 can be secured to the lens by using, for example, fastening tape. When the projector is turned on, the beam of light therefrom is directed first through slot 15 on surface 13 and thereafter through the second slot 16 on surface 14 in the form of a narrow beam of light as shown in FIG. 2.

Figure 3:
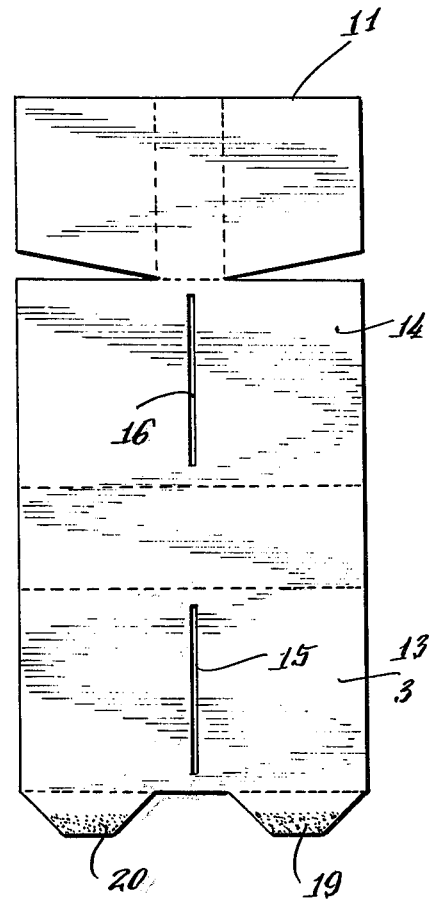
FIG. 3 is a top plan view of an educational device in accordance with the invention in disassembled form.

Referring now to FIG. 3, there is shown an educational device in accordance with the features of this invention as shown in FIG. 1, but in disassembled form. In disassembled form the device forms a unitary structure formed of a single piece of material which when properly folded along the dotted lines shown in FIG. 3 forms the device illustrated in FIG. 1. Tabs 19 and 20 can be secured by any fastening material, such as for example, a fastening tape onto surface 14 to securely hold the device together in the assembled form.

In accordance with the present invention, various suitable materials may be used for manufacturing the educational device herein described. However, in accordance with the preferred embodiments of this invention, the beam collimator is preferably formed of a single piece of material as shown in FIG. 3, preferably constructed of a paper-like material such as paper, cardboard, etc.

The educational device of the present invention is designed to allow the student to demonstrate for himself various physical properties of beams of light. For example, a student can learn to identify angles of incidence for reflection or refraction and demonstrate that the angle of incidence is equal to the angle of reflection. The student can do this with the beam collimator described herein by setting up an experiment such as illustrated in FIG. 4. Here, the student places beam collimator 21 over the center of lens 22 of light projector 23 and secures the collimator to the lens by using a fastening material such as cellophane tape. A protractor 24 is then placed on elevated surface 25 closely spaced to the light projector. Thereafter, the student secures a flat mirror 26 substantially perpendicular to surface 25 and employs masking tape to cover the mirror and place an approximate 2 millimeter verticle slit 27 at the center of the mirror. The student then places mirror 26 on protractor 24 so that slit 27 is directly over the meeting point of the protractor, and the plane of the mirror is precisely along the base line. Thereafter the student turns on the projector and adjusts the lens assembly until the narrow ray of light is directly on the narrow slit of the mirror. The light from the projector crosses the protractor at a specific angle which is measurable as shown in FIG. 4. The student can measure the angle of incidence by measuring the angle formed by the ray of light and the 90° line on the protractor. In a likewise manner the student can measure the angle of reflection by observing the angle formed by the reflected light coming off of mirror 26.

The educational device of the present invention can also be used by a student for demonstrating the bending of a beam of light or refraction. For example, and as shown in FIG. 5, the student sets up light projector 28 and beam collimator 29 in the same manner as described above. Thereafter two protractors 30 and 31 are secured together and a semi-circular clear glass dish 32 approximately halfway filled with water are set up in the manner as shown in FIG. 5. When the student turns the projector on, a beam of light enters the dish, hits the meeting point of the two protractors and bends when it leaves the dish as shown in FIG. 5. The bending is referred to as refraction. In the manner as described above, the angle of incidence and the angle of refraction can be measured by the student. Also, if desired a strip of paper having approximately the same height as dish 32 can be curved around the edge of protractor 31 so as to provide a screen for more clearly viewing the beam of light after it has left the dish.

In both of the above described experiments there is considerable freedom for the student to identify and change various variables. For example, the angle of incidence can be changed by the student to various amounts by moving the light source thereby enabling the student to observe various changes in the angles of incidence and reflection.

Various types of experiments which can be performed by students by using the educational device of this invention are explained in detail in "Science-A-Process Approach II, Module 84, Angles" published by the American Association of The Advancement of Science.

While I have illustrated and described a particular embodiment of my invention, it will be understood that various modifications may be made therein without departing from the spirit of the invention and the scope of the appended claims.

I claim:

1. An educational device for directing a single narrow beam of light comprising in combination:
   a. a beam collimator including a first body having a triangular shape; first and second elongated narrow slots disposed on opposite arms of said triangular shaped body, said first slot being in axial alignment with said second slot; a second body including an inverted U-shaped sleeve secured to and projecting from said first body and substantially surrounding said second slot; and
   b. a light source disposed within said second body whereby the light from said source is directed through said first and second slots in the form of a single narrow beam of light.

2. An educational device according to claim 1 wherein said light source is a projector and said U-shaped sleeve substantially surrounds at least the end portion of the lens extending from said projector.

3. An educational device according to claim 1 wherein said beam collimator is a unitary structure formed of a single piece of material adapted to folded along specific lines to form said collimator.

* * * * *